(12) United States Patent
Dohmen et al.

(10) Patent No.: US 10,948,941 B2
(45) Date of Patent: Mar. 16, 2021

(54) PEDAL UNIT FOR A MOTOR VEHICLE

(71) Applicant: Ford Global Technologies, LLC, Dearborn, MI (US)

(72) Inventors: Thomas Dohmen, Moenchengladbach (DE); Steffen Schoenfuss, Odenthal (DE); Christina Kallas, Rommerskirchen (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 16/918,001

(22) Filed: Jul. 1, 2020

(65) Prior Publication Data

US 2021/0004040 A1 Jan. 7, 2021

(30) Foreign Application Priority Data

Jul. 1, 2019 (DE) .................. 102019004525.4

(51) Int. Cl.
*G05G 1/30* (2008.04)
*G05G 1/42* (2008.04)
(Continued)

(52) U.S. Cl.
CPC ............. *G05G 1/42* (2013.01); *B60T 7/06* (2013.01); *B60W 10/08* (2013.01); *G05G 1/38* (2013.01);
(Continued)

(58) Field of Classification Search
CPC .. G05G 1/42; G05G 1/40; G05G 1/38; G05G 1/30; G05G 1/44; G05G 5/03; G05G 5/05;
(Continued)

(56) References Cited

U.S. PATENT DOCUMENTS 2,957,960 A * 10/1960 Ginn ..................... G05G 1/30
200/86.5
6,105,737 A 8/2000 Weigert et al.
(Continued)

FOREIGN PATENT DOCUMENTS

DE 102006030846 A1 * 1/2008 ............... B60T 7/04
DE 102010027924 A1 * 10/2011 ............ B60K 26/02
DE 102014103167 A1 * 9/2015 ............. B60T 7/042

OTHER PUBLICATIONS

Machine Translation of DE 102014103167, obtained Aug. 20, 2020.*
Machine Translation of DE 102010027924, obtained Aug. 20, 2020.*
Machine Translation of DE 102006030846, obtained Aug. 20, 2020.*

*Primary Examiner* — Richard W Ridley
*Assistant Examiner* — Brian J McGovern
(74) *Attorney, Agent, or Firm* — Burr & Forman, LLP

(57) ABSTRACT

A pedal unit for a motor vehicle may include a multiplicity of cylinder elements which are guided one inside the other in a telescopic fashion along a movement axis, a pedal face for a user, one or more spring elements, and a sensor unit. The pedal face may be coupled to one of the cylinder elements. Each of the spring elements is configured to interact with two cylinder elements assigned thereto, as a result of which, when the pedal face is activated an opposing force can be generated at the pedal face, the opposing force depending progressively on movement travel of the pedal face. The sensor unit may be configured to generate an output signal that is dependent on activation of the pedal face.

16 Claims, 4 Drawing Sheets

(51) Int. Cl.
*B60W 10/08* (2006.01)
*G05G 1/38* (2008.04)
*B60T 7/06* (2006.01)
*B60R 21/09* (2006.01)
*G05G 1/40* (2008.04)
*B60K 26/02* (2006.01)

(52) U.S. Cl.
CPC ........ *B60K 26/02* (2013.01); *B60K 2026/026* (2013.01); *B60R 21/09* (2013.01); *B60T 7/065* (2013.01); *B60W 2540/10* (2013.01); *G05G 1/30* (2013.01); *G05G 1/40* (2013.01)

(58) Field of Classification Search
CPC .... G05G 5/28; G05G 5/005; B60K 2026/026; B60K 2026/024; B60K 26/02; B60T 7/06; B60T 7/04; B60R 21/09
See application file for complete search history.

(56) References Cited

U.S. PATENT DOCUMENTS

| | | | |
|---|---|---|---|
| 6,182,525 B1 * | 2/2001 | Bowers | B60K 20/02 180/274 |
| 6,354,671 B1 | 3/2002 | Feldmann et al. | |
| 6,364,047 B1 * | 4/2002 | Bortolon | B60K 23/02 180/334 |
| 7,302,713 B1 * | 12/2007 | Bhatt | E03D 5/08 251/295 |
| 9,079,570 B2 | 7/2015 | Sellinger et al. | |
| 9,139,168 B2 * | 9/2015 | Jeon | B60T 7/042 |
| 2006/0112931 A1 * | 6/2006 | Meguro | G05G 1/38 123/399 |
| 2011/0132134 A1 * | 6/2011 | Kim | G05G 1/30 74/514 |
| 2017/0225570 A1 * | 8/2017 | El Aile | B60R 7/06 |
| 2018/0356853 A1 * | 12/2018 | Suntharalingam | B60K 23/02 |

* cited by examiner

PEDAL UNIT FOR A MOTOR VEHICLE

TECHNICAL FIELD

Example embodiments generally relate to vehicle brakes and, more particularly, relate to a pedal unit for a motor vehicle.

BACKGROUND

In modern vehicle construction, electrification and the development of electrical vehicles or electrical vehicle systems are becoming increasingly important. Brake systems also have an increasing number of electrical components (e.g. electrical brake boosters, control units, sensors etc.). In order to achieve a relatively high degree of polarity and flexibility, it is desirable to decouple the brake pedal mechanically from the brake booster and to use an electric brake pedal. However, this brake pedal should reproduce as well as possible the force/travel characteristic of a brake pedal in a conventional brake system. Under certain circumstances it may also be advantageous to generate a new force/travel characteristic which is not implemented in conventional brake systems. Furthermore it is advantageous, or even prescribed under certain circumstances that independent output signals are made available for a braking request, wherein, in particular, sensor data items which are acquired independently can be used.

Furthermore, in future the development of vehicles which have an autonomous driving mode will become increasingly important. As long as the autonomous driving mode is active, the vehicle is steered autonomously, which also includes the braking processors. In this case, it may be desirable to retract control components, such as the brake pedal, for example, in order to provide more space in the passenger compartment of the vehicle. In many cases, the vehicle will, however, also have a normal driving mode in which it is controlled by the driver.

U.S. Pat. No. 6,105,737 presents an electronic pedal simulator for a vehicle brake system, having an input element which is optionally moved by a vehicle driver, a device for determining a ratio between a position of the input element and a force with which the vehicle driver moves the input element, and a programmable spring device for optionally supporting and counteracting, in accordance with a predetermined ratio of position and force, a movement of the input element which is brought about by the vehicle driver.

U.S. Pat. No. 9,079,570 discloses a brake system of the brake-by-wire type for a motor vehicle, having a brake pressure generator which can be activated by means of a brake pedal of a pedal unit and outside the brake-by-wire operating mode can be connected to wheel brakes of the vehicle, a pressure source which can be activated by means of an electronic control unit and which can be connected to the wheel brakes of the vehicle in the brake-by-wire operating mode, means for sensing a driver's deceleration request and a pedal travel simulator which interacts with the brake pedal. The latter is formed by at least one simulator element and in the brake-by-wire operating mode it can be used to simulate a restoring force acting on the brake pedal, independently of the activation of the pressure source, wherein a force-travel characteristic of the pedal travel simulator is provided in a controllable fashion.

U.S. Pat. No. 6,354,671 discloses a brake value encoder for a brake system which is arranged in a vehicle and is composed of at least one module. The brake value encoder serves to generate a brake pressure and is activated by the driver. A device for generating the brake pressure is provided which has an input for a first physical variable which is derived from the activation by the driver. The output of a sensor device for sensing the activation by the driver is connected to an input of a control device for the vehicle. The pressure-generating device has a further input for a second physical variable which is derived from an output of the vehicle control device.

In view of these and other references that represent the state of the art, the provision of a pedal unit which can be used in a flexible fashion for an electrically controllable vehicle system certainly offers room for improvements.

BRIEF SUMMARY OF SOME EXAMPLES

Some example embodiments may provide a pedal unit which can be used in a flexible way for an electrically controllable vehicle system.

In accordance with an example embodiment, a pedal unit for a motor vehicle is provided. The pedal unit may include a multiplicity of cylinder elements which are guided one inside the other in a telescopic fashion along a movement axis, a pedal face for a user, one or more spring elements, and a sensor unit. The pedal face may be coupled to one of the cylinder elements. Each of the spring elements is configured to interact with two cylinder elements assigned thereto, as a result of which, when the pedal face is activated an opposing force can be generated at the pedal face, the opposing force depending progressively on movement travel of the pedal face. The sensor unit may be configured to generate an output signal that is dependent on activation of the pedal face.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
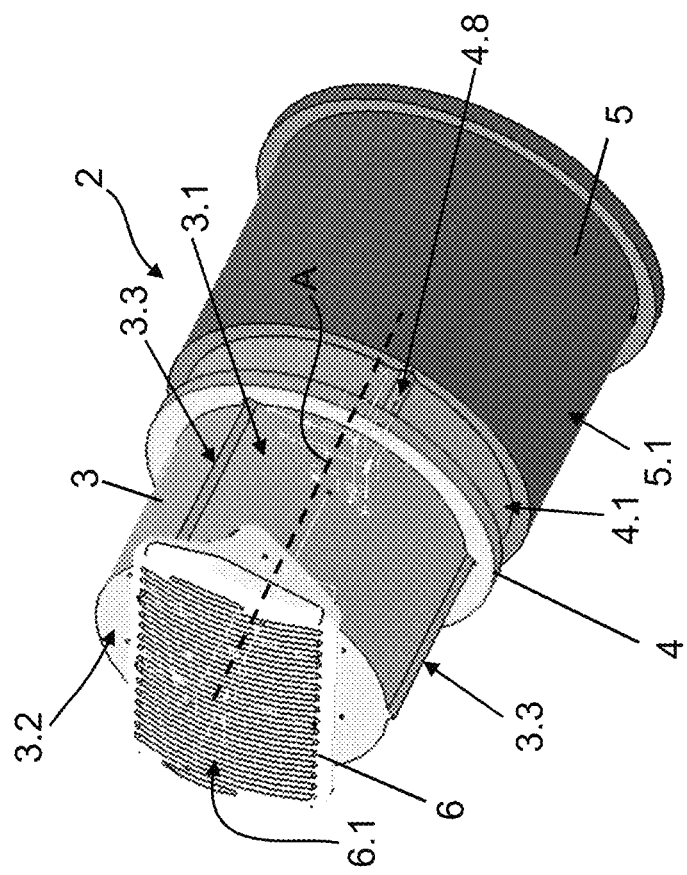
FIG. 1 illustrates a perspective view of a first embodiment of a pedal unit in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

Some example embodiments described herein may provide for features and measures which are specified individually in the following description, which can be combined with one another in any desired technically appropriate way and indicate further refinements of the invention. The description additionally characterizes and specifies example embodiments of the invention, in particular in conjunction with the figures.

Some embodiments make available a pedal unit for a motor vehicle. The motor vehicle can be, for example, a truck or passenger car. The term "pedal unit" implies in this context that it is provided for operation with a foot and is therefore also arranged in the footwell of the motor vehicle. In particular, the pedal unit can be assigned to a brake pedal or to a gas pedal or accelerator pedal.

The pedal unit has a multiplicity of cylinder elements which are guided one inside the other in a telescopic fashion along a movement axis. The cylinder elements are guided one inside the other in a telescopic fashion, i.e. they are nested one inside the other and at the same time can be moved relative to one another (in the direction of the movement axis). It can also be said that the pedal unit has a telescopic arrangement which has the specified number of cylinder elements. The dimensions of two cylinder elements are in each case matched to one another here in such a way that they can be moved in a guided fashion with respect to one another. The axis along which the movement is possible is referred to in this context as a movement axis. Of course, different cylinder elements can be moved to differing degrees along the movement axis. The term "cylinder element" is not to be interpreted in a restrictive fashion in respect of the geometry of the specified elements. Therefore, these can be embodied in a cylindrical or cylinder-like fashion, but, for example, a prismatic configuration, configuration in the shape of a truncated pyramid, rectangular configuration or some other type of configuration is also conceivable. In order to implement the telescopic movement, the cylinder elements are normally embodied in a hollow fashion and have an outer wall which extends parallel to the movement axis and which forms, as it were, a lateral face of the cylinder element. At least some of the cylinder elements can also have a final wall which extends transverse to a respective movement axis, for example a cover wall or base wall. Owing to the telescopic arrangement, the outer walls of the adjacent cylinder elements are supported by one another, as a result of which the entire pedal unit is stabilized with respect to forces acting transversely to the movement axis, even if the individual outer walls are embodied in a comparatively weak fashion. Therefore, different materials, such as for example plastic but also metals, can be used for the cylinder elements.

In the course of the telescopic movement, air between the cylinder elements can be compressed or expanded, i.e. changes in pressure can occur. In order to compensate for this, at least one cylinder element can have at least one venting hole. In order to prevent dust or the like being sucked into the telescopic arrangement through such a venting hole, at least one venting hole with a dust filter can be provided. Of course, a single dust filter can also protect a multiplicity of venting holes.

Some embodiments of the pedal unit also have a pedal face for a user which is coupled to a cylinder element. The coupling is, for example, force-transmitting here so that a force which the user applies to the pedal face with his foot is transmitted to the corresponding cylinder element. It is possible that the pedal face is formed directly on the cylinder element or on a separate element which is connected in a correspondingly force-transmitting fashion to the cylinder element. The pedal face can be embodied in a flat, curved and/or bent fashion. It can also have profiling in order to improve the friction with respect to the user's feet. It goes without saying that the cylinder elements can be shifted one inside the other in a telescopic fashion through the activation of the pedal face.

Moreover, the pedal unit has at least one spring element, wherein each spring element is configured to interact with two cylinder elements which are assigned to it, as a result of which, when the pedal face is activated an opposing force can be generated at it, which opposing force depends progressively on activation travel of the pedal face. In this context, "progressively" means that the dependence of the opposing force on the activation travel is not continuously linear but rather rises relatively strongly at least starting from a certain point. This expressly includes the possibility that the dependence up to this point is linear. It can also have, considered individually, a plurality of linear sections with increasing gradient. The pedal unit preferably has a multiplicity of spring elements. The respective spring element can be embodied, for example, as a helical spring made of spring steel or fiber-reinforced plastic. Alternatively, it is, however, possible also to use spring elements made of an elastomer such as rubber, silicone or the like which can have very different shapes. In each case a spring element is configured to interact with two cylinder elements which are assigned to it. That is to say a force flux by means of the spring element is possible between the two cylinder elements. However, depending on the position of the cylinder elements with respect to one another it is not necessary for every spring element to be continuously in contact with the cylinder elements which are assigned to it. For example, when a pedal face is relieved of loading a spring element, it can be decoupled from at least one of the cylinder elements which are assigned to it, for example in such a way that an intermediate space is formed between the cylinder element and the spring element.

For the interaction of the respective spring element with the cylinder elements elastic deformation of the spring element takes place when the cylinder elements move with respect to one another. As a rule, when the pedal face is activated and the moving together of the cylinder elements which is associated with this takes place the spring element is compressed. The deformation results in a restoring force as a result of which an opposing force, which depends progressively on the activation travel of the pedal face, is produced, preferably as a result of the combined effective plurality of spring elements, on the pedal face. In this context, "activation travel" denotes the deflection which the pedal face experiences when activation by the user occurs. The "opposing force" is here the force which acts on the user's foot from the pedal face, in opposition to the force which it applies to the pedal face. In addition to the restoring forces of the at least one spring element, other forces can also contribute to the opposing force, as will be explained below. In the case of an individual spring element, a linear restoring force is normally produced, which force depends linearly on the activation travel. In contrast, a progressive restoring force, which differs from a linear profile at least starting from a certain point, can be brought about through the combined effect of a plurality of spring elements. This could involve here, for example, a two-stage profile, wherein the restoring force has a first, relatively low gradient depending on the activation travel up to a certain point, and starting from this point a second, relatively high gradient. However, in general, a complicated profile is produced which cannot necessarily be divided into linear sections. However, a non-linear progressive dependence can also be implemented with a single spring element, e.g. if the latter is manufactured from a combination of different materials such as POM (polyoxymethylene), rubber, silicone, steel or the like. With a single material it is also possible to implement a progressive dependence, e.g. with an elastomer material which has one or more recesses. Initially, the recesses are mainly compressed, in which case the element reacts less severely than in the case of progressive compression when the recesses are entirely or predominantly compressed, and the polymer material itself has to be compressed. A significant advantage of a multiplicity of spring elements in contrast to a spring element is the increased safety or reliability. The use of a plurality of spring elements generally includes a level of redundancy so that if a spring element fails the functioning of the pedal unit is still ensured (although to a limited degree), e.g. so that in all cases the pedal unit can be returned to its original position when it is not activated.

In the case of a plurality of spring elements it may be advantageous if they are either spaced apart from one another in the transverse direction with respect to the movement axis or a separating element is arranged between every two adjacent spring elements, which element prevents the spring elements from striking against one another or rubbing against one another. In the case of two concentrically arranged helical springs, such a separating element could be arranged, for example, as a cylindrical collar between the helical springs. The separating element can optionally be embodied in an elastic fashion, e.g. with an elastomer, as a result of which possible generation of noise is minimized.

Furthermore, the pedal unit has at least one sensor unit for generating an output signal which is dependent on the activation of the pedal face. The output signal is normally dependent on the activation travel, wherein under certain circumstances there is no clear assignment between the output signal and the activation travel but rather the output signal can additionally depend on the movement direction of the pedal face. In other words, there may be a hysteresis, as will also be explained below. The output signal can correspond to an analog or digital value which may be, for example, proportional to the activation travel. It can be processed, for example, by an evaluation unit and used to control a brake system or a vehicle motor or engine.

The pedal unit of example embodiments is suitable, for example, for drive-by-wire or brake-by-wire systems in which the input which is generated by the user via the pedal face is transmitted in a purely electrical fashion to the unit which is to be actuated (for example brake system or motor or engine). Since the pedal unit does not require a mechanical connection to other systems, it can in this respect be positioned in any desired fashion, in particular as far as its orientation within the motor vehicle is concerned. The lack of a mechanical connection also facilitates integration into very different motor vehicles. Furthermore, as a result of the absence of mechanical transmission components there is also no risk that in the case of an accident such components could penetrate the footwell and injure the driver. The pedal unit is of essentially modular design with a plurality of cylinder elements and at least one spring element (preferably a plurality of spring elements) which can each be adapted individually in respect of properties depending on the vehicle-specific requirements. For example, the profile of the restoring force can be changed by adapting individual spring elements.

The pedal unit is advantageously configured to generate opposing force acting on the pedal face, in a purely passive fashion by means of restoring forces of the at least one spring element as well as friction forces which act within the pedal unit. That is to say, on the one hand, the restoring forces of the individual spring element or elements which result for the deformation thereof act. On the other hand, friction forces within the pedal unit can contribute decisively to the opposing force. Depending on the movement direction of the pedal face, the friction forces can increase the opposing force (when the pedal unit is actuated) or reduce it (when the pedal unit is relieved of loading). In this way, a hysteresis is produced during the force/travel characteristic, which corresponds to the behavior of a "conventional" pedal and is in this respect desired. The friction forces can be effected through the shape and dimensioning of the surfaces which interact with one another and through the surface structure and surface material therefore. Both the restoring forces of the spring elements and the friction forces come about passively, that is to say without a motor/engine unit, external energy source or controller. This contributes both to reducing costs and to saving weight.

The pedal unit can be adjusted in the operating state between a fully expanded end position and a fully compressed end position. In order to prevent an audible impact occurring when an end position is reached, the pedal unit can have one or more elastic buffer elements (e.g. made of rubber or some other elastomer) which can, for example, be intermediately arranged between adjacent cylinder elements. This may be appropriate, in particular, in the case of purely passively occurring return of the pedal unit into the fully expanded position, e.g. when the user removes his foot completely from the pedal face after he has previously depressed it.

According to one configuration, the pedal face is coupled to a first cylinder element, a second cylinder element has a stop for the first cylinder element, a first spring element is assigned to the first cylinder element and to the third cylinder element, and a second spring element is assigned to the second cylinder element and to the third cylinder element. The pedal face is coupled to the first cylinder element, i.e. the force effect implemented by the user is firstly applied to the first cylinder element. A first spring element is assigned to the first cylinder element and to the third cylinder element, i.e. when the first cylinder element is moved, the first spring element generates a restoring force between itself and the third cylinder element. In this context, there is normally provision that the third cylinder element is arranged in a stationary fashion with respect to the vehicle. The second cylinder element, which is normally intermediately arranged between the first and third cylinder elements and seen from the movement axis, has a stop for the first cylinder element, wherein these two cylinder elements are otherwise not coupled by a spring element. When the first cylinder element moves, at first only a friction force acts between said cylinder element and the second cylinder element, which friction force can, however, be partially compensated by the effect of the second spring element between the second and third cylinder elements and/or by a friction force between the second and third cylinder elements. Therefore, at most a slight movement of the second cylinder element toward the third cylinder element occurs until the first cylinder element impacts against the stop. As a result of the latter, the movement of the second cylinder element is coupled to that of the first cylinder element, so that a further movement of the first cylinder element brings about deformation of both the first and second spring elements. That is to say as soon as the first cylinder element enters into contact with the stop, the restoring force acting on the first cylinder element and therefore on the pedal face increases strongly. This results in approximately two-stage suspension, the profile of which can be set by the spring constants of the first and second spring elements.

According to a further configuration, at least one cylinder element has two walls as well as an intermediate space in which another cylinder element is guided. That is to say the one cylinder element has a double-walled structure with an inner wall and an outer wall which are spaced apart from one another by the specified intermediate space. With this design, on the one hand the guidance of the two cylinder elements with respect to one another can be improved, since the one cylinder element encloses the other, as it were, from two sides. On the other hand, under certain circumstances higher friction can be generated between the two cylinder elements than in the case of a wall, which may be desired under certain circumstances. Finally, the stability of the entire pedal unit in the transverse direction with respect to the movement axis can be improved by the double-walled design.

Normally, rotation of the cylinder elements with respect to one another is undesired since this would normally mean rotation of the pedal face with respect to the motor vehicle. Insofar as the cylinder elements are in any case embodied in a rotationally secure fashion, for example in a polygonal-prismatic fashion, this risk does not arise. In the case of an overall cylindrical shape, rotation has to be prevented in some other way. In each case two cylinder elements which are guided one inside the other advantageously have guide structures which engage with one another and by which the cylinder elements are guided in a rotationally fixed fashion with respect to the movement axis. At least one of the guide structures runs parallel to the movement axis here and can be embodied, for example, as a groove into which a single projection or a web which also runs parallel to the movement axis engages, said web representing the other guide structure.

Basically, the pedal unit can function with a single sensor unit. Since the pedal unit is, however, a safety-relevant system, redundancy is advantageous in this respect. Therefore, the pedal unit preferably has a first sensor unit and a second sensor unit wherein the first sensor unit and the second sensor unit are based on different measuring principles. That is to say the first and the second sensor units either measure different physical variables, which respectively permit a conclusion to be drawn about the activation of the pedal face, or they measure one and the same physical variable in different ways which are independent of one another.

In this context, the first sensor unit can advantageously be embodied as a travel sensor. Such a travel sensor is configured to measure the activation travel and a distance which is related to the activation travel in a simple unambiguous way. It is also possible to measure a position which easily permits a conclusion to be drawn about the activation travel. In this context, very different measuring principles, which cannot be completely enumerated here, are known in the prior art. For example, a distance measurement could take place optically or acoustically. Alternatively or in particular additionally, the second sensor unit can be embodied as a force sensor or as a pressure sensor. In particular, the second sensor unit can be configured to measure a force or a pressure which is applied to at least one cylinder element by at least one spring element.

Since with the pedal unit according to the invention there is no need whatsoever for mechanical transmission of force to another system, there is no need whatsoever for transmission, for example via a lever. Therefore a pedal element which has the pedal face can be connected to a cylinder element in such a way that it is guided parallel to the movement axis. That is to say the movement of the pedal element—and therefore the movement of the pedal face, is as it were coupled to the movement of the cylinder element. The pedal element, like the cylinder element, carries out a linear straight movement along the movement axis. As already stated above, the orientation of the pedal unit and therefore of the movement axis can be selected essentially freely, so that in this respect an ergonomically favorable arrangement is possible.

In order to ensure for optimum force sensing e.g. in a force sensor, it is preferred that at least one spring element is supported on a support element which is supported on a cylinder element via the second sensor unit. That is to say the corresponding spring element is not supported directly on the second sensor unit but instead the support element is arranged intermediately with respect to the force flux. In particular, the force flux runs from the spring element to the cylinder element via the support element and the sensor unit. There can in particular also be provision that a multiplicity of spring elements are supported on the support element. The support element can, under certain circumstances, also protect the second sensor unit against damage or maladjustment in the course of the mounting of the pedal unit.

The application possibilities of the pedal unit according to the invention are not limited to pure drive-by-wire or brake-by-wire systems. Rather, they can also be used in a motor vehicle which is designed for autonomous driving. In future, it will also be mainly possible for such vehicles to be optionally controllable by the driver and therefore to have two operating modes, specifically the conventional operating mode which is steered by the driver as well as the autonomous driving mode. In the autonomous driving mode it may be advantageous if the pedal unit is retracted or even completely lowered. As a result, on the one hand, the space which is available in the passenger compartment is enlarged, and on the other hand, this, normally in addition to other signals, indicates to the driver that the motor vehicle is in the autonomous driving mode and operating the pedal unit is therefore unnecessary or would have no effect whatsoever. According to a corresponding configuration, the pedal unit has a motor-driven adjustment mechanism by which the pedal face can be moved out of an operating position, in which it can be operated by the user, into a retracted storage position. The adjustment mechanism usually has an electric motor, but e.g. pneumatic or hydraulic operation would also be conceivable. The movement of the pedal face normally takes place in a linear fashion, wherein the electric motor can either be embodied as a linear motor or can bring about the adjustment of the pedal face via a suitable transmission mechanism, such as, for example, a spindle drive. The adjustment of the pedal face normally involves corresponding adjustment of all the cylinder elements, that is to say adjustment of the entire telescopic arrangement. For example, the adjustment mechanism can act on a cylinder element which in the normal operating mode is arranged in a stationary fashion on the vehicle. The pedal face can be arranged in the storage position, for example on a plane with an inner face of the footwell of the motor vehicle, or it can even be lowered completely behind this inner face. In the storage position, the spring elements are, of course, correspondingly tensioned, but locked, wherein the locking is cancelled when the operating position is set.

Figure 2:
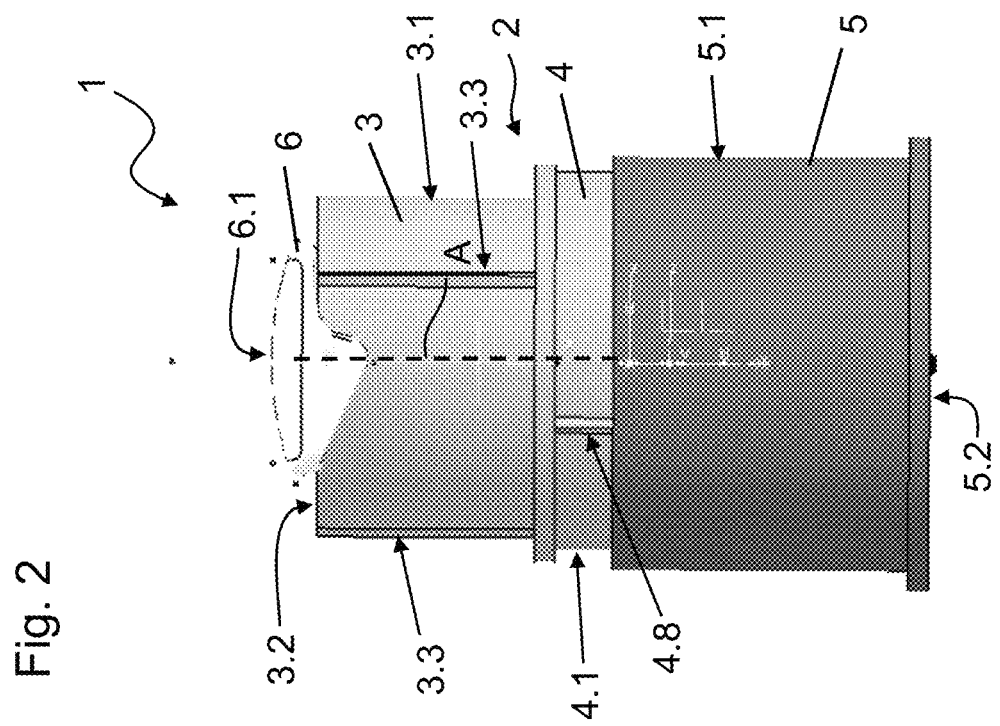
FIG. 2 illustrates a side view of the pedal unit of FIG. 1 in accordance with an example embodiment.
Figure 3:
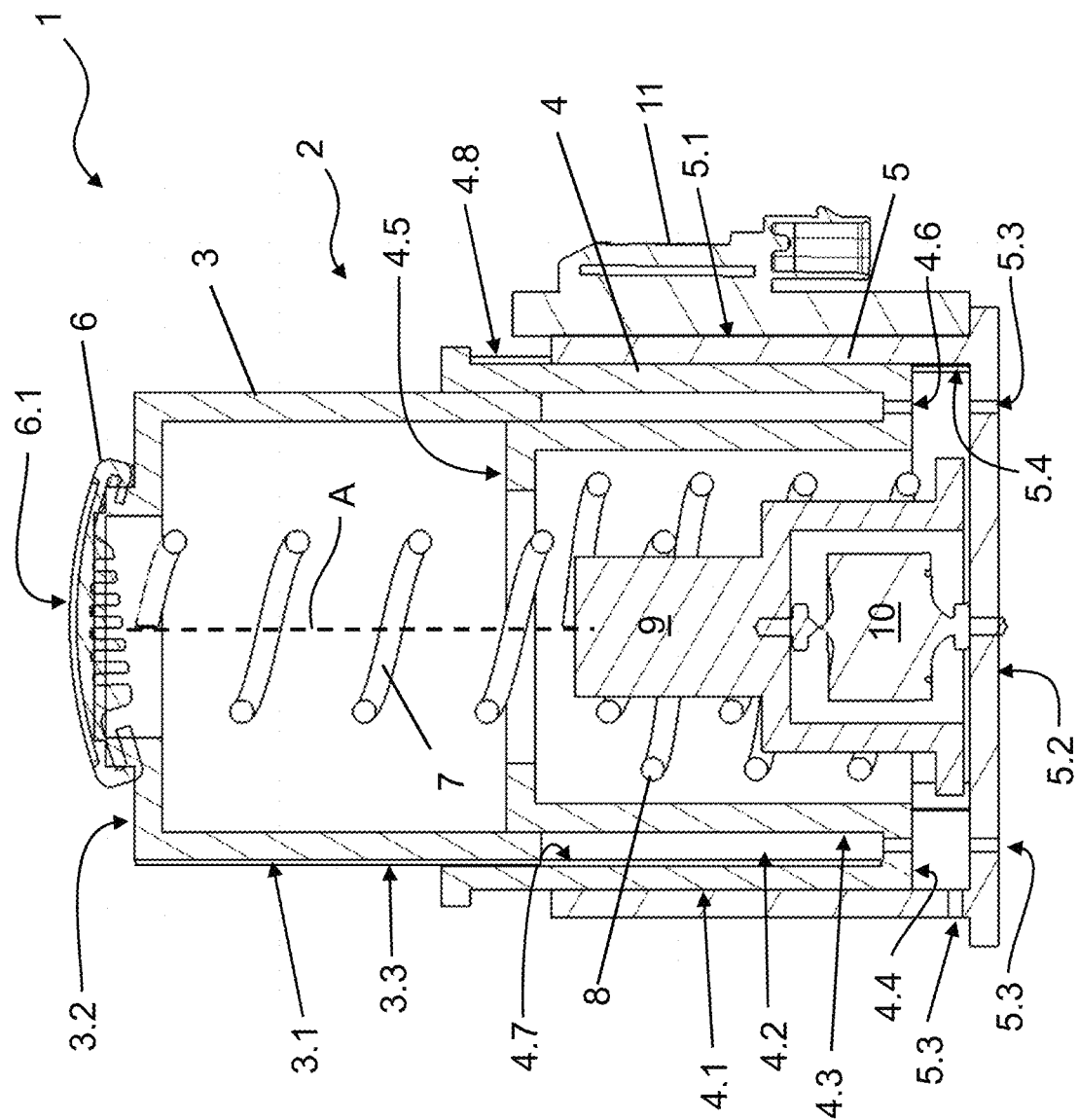
FIG. 3 illustrates a sectional view of the pedal unit of FIG. 1 in accordance with an example embodiment.

FIGS. 1-3 show a first embodiment of a pedal unit 1 according to the invention, which can be used, for example, in a passenger car. The pedal unit 1 can function, for example, as a brake pedal or acceleration pedal. It has a telescopic arrangement 2 which has three cylinder elements 3-5 in the present case. The cylinder elements 3-5 are guided one inside the other in a telescopic fashion, wherein the guidance is provided along a movement axis A. The cylinder elements 3-5 are embodied in a cylinder-like fashion and are mainly embodied symmetrically with respect to the movement axis A.

A first cylinder element 3 has a cylinder-like outer wall 3.1 and a planar cover wall 3.2 on which a pedal element 6 made of metal is attached, said pedal element 6 having a pedal face 6.1 for a user. In this context, the terms "cover wall" and "base wall" are not to be interpreted in a restrictive fashion with respect to the provided arrangement of the pedal unit 1 in the motor vehicle. That is to say in the installed state a "cover wall" does not necessarily have to be arranged above a "base wall". The first cylinder element 3 is molded, like the two other cylinder elements 4, 5, from plastic and is embodied with thin walls.

A second cylinder element 4 has a double-walled design with an outer wall 4.1 and an inner wall 4.3 (FIG. 3) which are both embodied in the manner of a cylinder and are connected to one another by a planar, annular connecting wall 4.4. An intermediate space 4.2, in which the outer wall 3.1 of the first cylinder element 3 is guided, is formed between the inner wall 4.1 and the outer wall 4.3. In order to prevent rotation of the first cylinder element 3 and of the second cylinder element 4 with respect to one another about the movement axis A, the first cylinder element 3 has a multiplicity of guide webs 3.3 which run parallel to the movement axis A and which engage in corresponding guide grooves 4.7 in the outer wall 4.1 of the second cylinder element 4. In order to prevent excess pressure or a partial vacuum building up in the intermediate space 4.2 when the first cylinder element 3 moves with respect to the second cylinder element 4, a multiplicity of venting holes 4.6 are formed in the lower connecting wall 4.4.

A third cylinder element 5 has in turn a cylindrical outer wall 5.1 and a planar base wall 5.2. The outer wall 4.1 of the second cylinder element 4 is guided on the outer wall 5.1 of the third cylinder element 5. In order to ensure a rotationally fixed connection, the outer wall 4.1 of the second cylinder element 4 has a multiplicity of guide webs 4.8 which run parallel to the movement axis A and engage with corresponding guide grooves 5.4 in the outer wall 5.1 of the first cylinder element 4. In order to equalize pressure with the surroundings of the pedal unit 1, a multiplicity of venting holes 5.3 are formed both in the outer wall 5.1 and in the base wall 5.2. In order to prevent dust from being sucked in from the surroundings when a partial vacuum forms in the interior of the telescopic arrangement 2, the venting holes 5.3 can be protected by one or more dust filters, which are not illustrated here for reasons of clarity.

As a result of the fact that the cylinder elements 3-5 are guided one inside the other and as it were nested one inside the other, and as a result of the double-walled configuration of the second cylinder element 4, a high level of stability with respect to forces which act in the transverse direction with respect to the movement axis A is obtained despite the comparatively thin-walled configuration from plastic.

The pedal unit 1 also has a first spring element 7 and a second spring element 8 which are both supported on a support element 9. Both spring elements 7, 8 are embodied here as helical springs made of spring steel, but they can also be fabricated, for example, from fiber-reinforced plastic or embodied as elastomer elements. In the embodiment shown, the spring elements 7, 8 can be spaced clearly apart from one another in the transverse direction with respect to the movement axis A so that contact is virtually ruled out. In particular when there is a relatively small distance it may be appropriate to arrange a separating element (not illustrated here) between the adjacent spring elements 7, 8, which separating element prevents the spring elements 7, 8 from impacting or rubbing against one another. The separating element could be arranged e.g. as a cylindrical collar made of an elastomer between the spring elements 7, 8.

The support element 9 is in turn supported on the base wall 5.2 of the third cylinder element 5 via a force sensor 10. The support element 9 is spaced apart here from the base wall 5.2 in the direction of the movement axis A so that no direct transmission of force is possible. The first spring element 7 is arranged at an end opposite the support element 9, adjacent to the pedal element 6, which is in turn connected to the first cylinder element 3. The second spring element 8 is arranged, at an end opposite the support element 9, adjacent to the cover wall 4.5 of the second cylinder element 4, wherein a smaller distance is provided in the direction of the movement axis A. Arranged on the outside of the third cylinder element 5 is a travel sensor 11 whose method of functioning can be based, for example, on the Hall effect or inductive effects and is configured to measure a movement of the first cylinder element 3 with respect to the third cylinder element 5. The corresponding movement is equal to activation travel of the pedal face 6.1.

FIGS. 1-3 show the pedal unit 1 in an unloaded or unactivated state. If a user applies a force via the pedal face 6.1, this firstly causes the first cylinder element 3 to move with respect to the third cylinder element 5 and, if appropriate, also with respect to the second cylinder element 4. Whether the latter movement occurs depends on the friction forces, on the one hand, between the first cylinder element 3 and the second cylinder element 4 and, on the other hand, between the second cylinder element 4 and the third cylinder element 5. The movement of the first cylinder element 3 with respect to the third cylinder element 5 brings about compression of the first spring element 7 and a restoring force, associated therewith, on the pedal element 6 or the pedal face 6.1. Insofar as the friction force between the first cylinder element 3 and the second cylinder element 4 is greater than the friction force between the second cylinder element 4 and the third cylinder element 5, the second cylinder element 4 moves with respect to the third cylinder element 5, wherein the cover wall 4.5 ultimately enters into contact with the second spring element 8. This is subsequently compressed until the tension in the second spring element 8 compensates for the difference between the abovementioned friction forces.

The spring tensions of the first fault element 7 and that of the second spring element 8 also act on the force sensor 10 via the support element 9 and are registered by said sensor. Said force sensor 10 can generate an output signal which can be, for example, proportional to the acting force. Progressive compression of the first spring element 7 subsequently occurs, for which reason the force rises essentially linearly. This change of the cover wall 3.2 of the first cylinder element 3 comes to rest on the cover wall 4.5 of the second cylinder element 4 and/or the lower edge of the outer wall 3.1 of the first cylinder element 3 comes to rest on the connecting wall 4.4. In this context, the cover wall 4.5 and/or the connecting wall 4.4 form/forms a stop for the first cylinder element 3. If the first cylinder element 3 is deflected even further owing to a force which acts on the pedal face 6.1, this is accompanied by corresponding deflection of the second cylinder element 4. Therefore, not only compression of the first spring element 7 but also of the second spring element 8 occurs, as a result of which the restoring force rises progressively, which is registered by the force sensor 10. At the same time, the movement of the first cylinder element 3, and therefore the activation travel, are registered by the travel sensor 11, from which a force/travel profile can be derived.

If the friction forces between the individual cylinder elements 3-5 were negligible, a uniquely defined, albeit non-linear, relationship would be present between the activation travel and the force registered in the force sensor 10. These friction forces are, however, not negligible, which is desired in order to generate a hysteresis which can also be sensed by the user when the pedal unit 1 is activated. Therefore, for a given activation travel the force which is registered by the force sensor 10 differs depending on whether the user loads or relieves the loading on the pedal face 6.1. In particular, by adjusting the measured values of the force sensor 10, on the one hand, and of the travel sensor 11, on the other hand, it is possible to determine the direction in which the pedal face 6.1 is currently moving. If the abovementioned hysteresis is ignored, the measured values of the force sensor 10 and of the travel sensor 11 can also be considered to be redundant with respect to one another.

The pedal unit 1 can be adjusted in the operating state between a fully expanded end position (corresponding to FIG. 3) and a fully compressed end position (not illustrated). In order to prevent an audible impact occurring when an end position is reached, the pedal unit 1 can have one or more elastic buffer elements (e.g. made of rubber or some other elastomer) which can be intermediately arranged e.g. between adjacent cylinder elements 3, 4, 5. The buffer elements are not illustrated in the figures.

Figure 4:
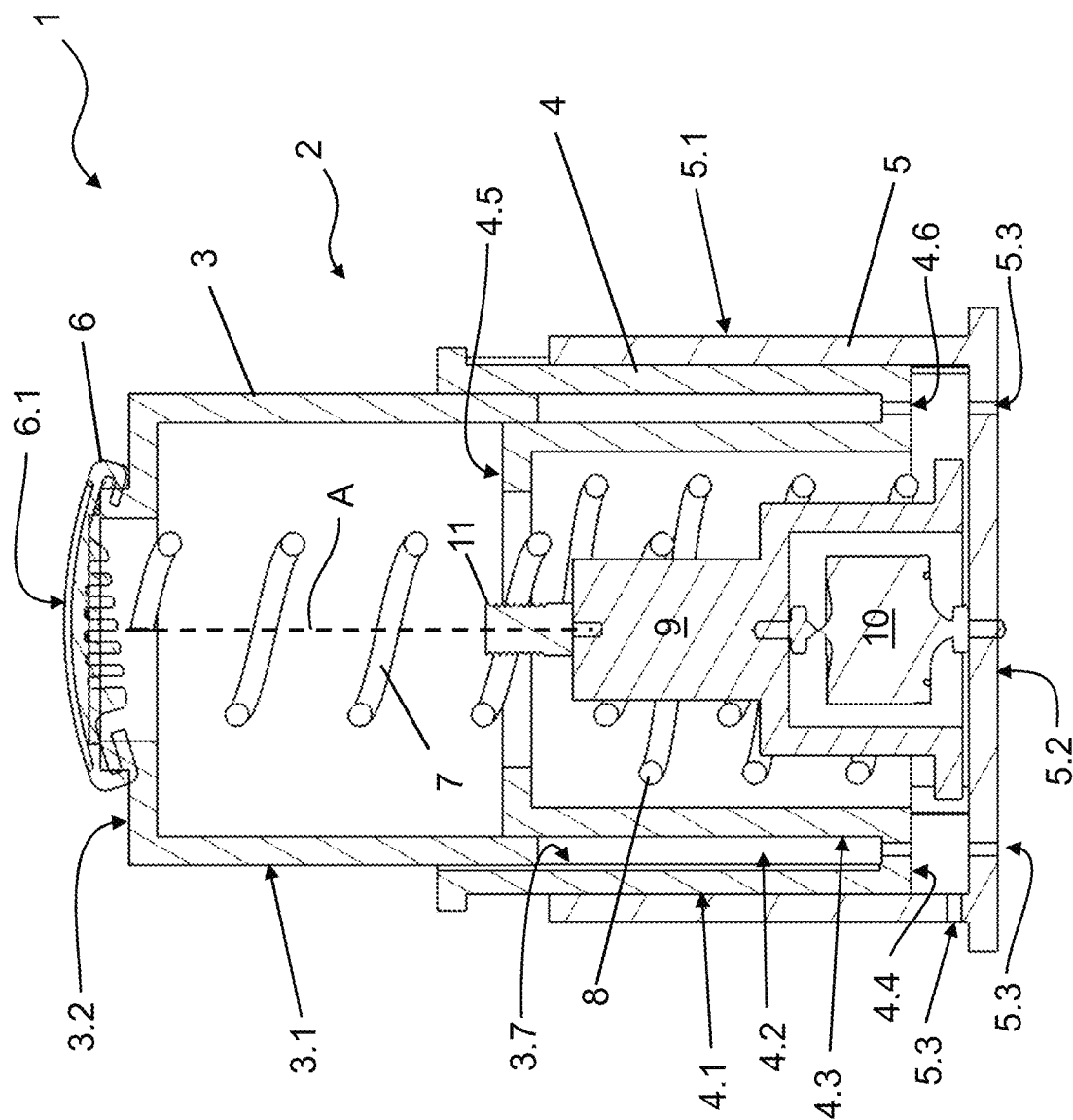
FIG. 4 illustrates a sectional view of a second embodiment of a pedal unit in accordance with an example embodiment.

FIG. 4 shows a second embodiment of a pedal unit according to the invention which differs from the embodiments shown in FIGS. 1-3 only in that an opto-electrical sensor is used as the travel sensor 11, said opto-electrical sensor being arranged on the support element 9 and registering the distance from the pedal element 6.

Figure 5:
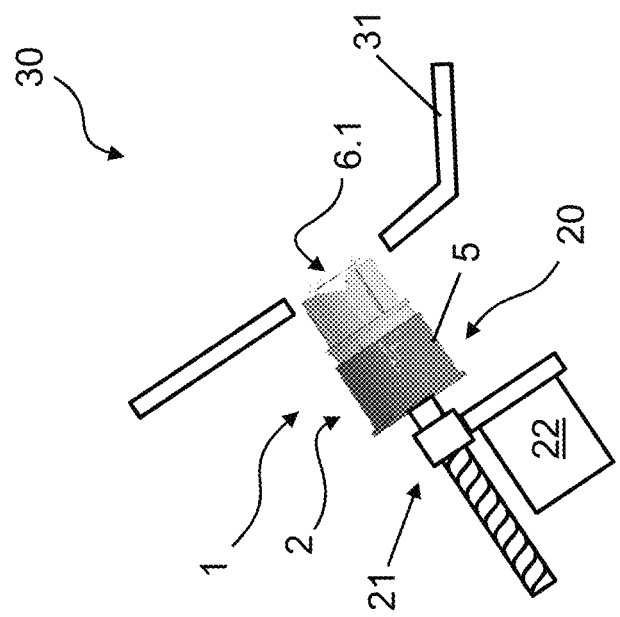
FIG. 5 illustrates a sectional view of part of a motor vehicle with a third embodiment of a pedal unit in an operating position in accordance with an example embodiment.
Figure 6:
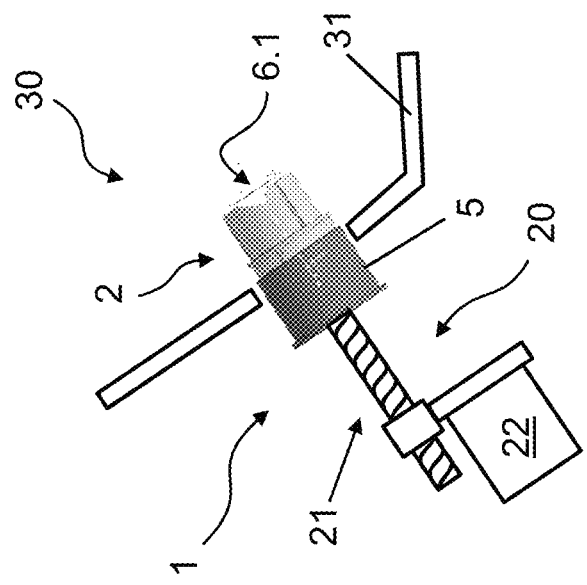
FIG. 6 illustrates a sectional view corresponding to FIG. 5 with the pedal unit in a storage position in accordance with an example embodiment.

FIGS. 5 and 6 show part of a motor vehicle with a third embodiment of a pedal unit 1 according to the invention, which can correspond essentially to one of the first two embodiments. However, the third cylinder element 5 is connected in this case to an adjustment mechanism 20 by which the entire telescopic arrangement 2, and therefore also the pedal face 6.1, can be retracted from an operating position (illustrated in FIG. 5) in which it is located, up to the edge of the third cylinder element 5, above an inner surface 31 of the vehicle in the footwell 30, into a storage position (illustrated in FIG. 6) in which it is located underneath the inner surface 31. The third cylinder element 5, which cannot be moved by the activation of the pedal face 6.1, is also arranged underneath the inner surface 31 in the operating position. The adjustment mechanism 20 is illustrated schematically here with a spindle drive 21 on which an electric motor 22 acts. However, it goes without saying that other mechanisms would also be possible.

The storage position is provided in an autonomous driving mode of the motor vehicle in which the user does not control the motor vehicle himself.

Thus, according to an example embodiment, a pedal unit for a motor vehicle may be provided. The pedal unit may include a multiplicity of cylinder elements which are guided one inside the other in a telescopic fashion along a movement axis, a pedal face for a user, one or more spring elements, and a sensor unit. The pedal face may be coupled to one of the cylinder elements. Each of the spring elements is configured to interact with two cylinder elements assigned thereto, as a result of which, when the pedal face is activated an opposing force can be generated at the pedal face, the opposing force depending progressively on movement travel of the pedal face. The sensor unit may be configured to generate an output signal that is dependent on activation of the pedal face.

The pedal unit of some embodiments may include additional features, modifications, augmentations and/or the like to achieve further objectives or enhance functionality and/or durability of the pedal unit. The additional features, modifications, augmentations and/or the like may be added in any combination with each other. Below is a list of various additional features, modifications, and augmentations that can each be added individually or in any combination with each other. For example, the pedal unit may be configured to generate the opposing force acting on the pedal face, in a passive fashion by means of restoring forces of the one or more spring elements as well as friction forces that act within the pedal unit. In an example embodiment, the pedal face may be operably coupled to a first cylinder element, a second cylinder element has a stop for the first cylinder element, a first spring element of the one or more spring elements is assigned to the first cylinder element and to the third cylinder element, and a second spring element of the one or more spring elements may be assigned to the second cylinder element and to the third cylinder element. In some cases, at least one cylinder element may have two walls and an intermediate space in which another cylinder element is guided. In an example embodiment, two cylinder elements that are guided one inside the other may have guide structures that engage with one another and by which the two cylinder elements are guided in a rotationally fixed fashion with respect to the movement axis. In some cases, the sensor unit may include a first sensor unit and a second sensor unit, and the first sensor unit and the second sensor unit may be based on different measuring principles. In an example embodiment, the first sensor unit may be embodied as a travel sensor, and the second sensor unit may be embodied as a force sensor or pressure sensor. In some cases, the one or more spring elements may be supported on a support element that is supported on one of the cylinder elements via the second sensor unit. In an example embodiment, a pedal element at which the pedal face is mounted may be connected to one of the cylinder elements in such a way that the pedal element is guided parallel to the movement axis. In an example embodiment, the pedal unit may have a motor-driven adjustment mechanism by which the pedal face is movable out of an operating position, in which the pedal unit is operable by the user, into a retracted storage position.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A pedal unit for a motor vehicle, the pedal unit comprising:
    a plurality of cylinder elements which are guided one inside the other in a telescopic fashion along a movement axis such that each cylinder element contributes to a length of the pedal unit when the pedal unit is fully extended, the plurality of cylinder elements comprising a first cylinder element that is guided inside a second cylinder element that is guided inside a third cylinder element;
    a pedal face for a user, the pedal face being coupled to the first cylinder element; and
    a plurality of spring elements, each spring element being configured to interact with two cylinder elements to contribute to an opposing force at the pedal face;
    wherein the second cylinder element includes a vent hole to control pressure.

2. The pedal unit of claim 1, wherein the pedal unit is configured to generate the opposing force acting on the pedal face; in a passive fashion by means of restoring forces of the plurality of spring elements as well as friction forces that act within the pedal unit.

3. The pedal unit of claim 1, wherein the second cylinder element has a stop for the first cylinder element,
    a first spring element of the plurality of spring elements is assigned to the first cylinder element and to the third cylinder element, and
    a second spring element of the plurality of spring elements is assigned to the second cylinder element and to the third cylinder element.

4. The pedal unit of claim 1, wherein at least one cylinder element has two walls and an intermediate space in which another cylinder element is guided.

5. The pedal unit of claim 1, wherein two cylinder elements that are guided one inside the other have guide structures that engage with one another and by which the two cylinder elements are guided in a rotationally fixed fashion with respect to the movement axis.

6. The pedal unit of claim 1, further comprising a first sensor unit and a second sensor unit, wherein the first sensor unit and the second sensor unit are based on different measuring principles.

7. The pedal unit of claim 6, wherein the first sensor unit is embodied as a travel sensor, and the second sensor unit is embodied as a force sensor or pressure sensor.

8. The pedal unit of claim 6, wherein the plurality of spring elements are supported on a support element that is supported on the third cylinder elements via the second sensor unit.

9. The pedal unit of claim 1, wherein a pedal element at which the pedal face is mounted is connected to the first cylinder elements in such a way that the pedal element is guided parallel to the movement axis.

10. The pedal unit of claim 1, wherein the pedal unit has a motor-driven adjustment mechanism by which the pedal face is movable out of an operating position, in which the pedal unit is operable by the user, into a retracted storage position.

11. The pedal unit of claim 1, wherein a first spring element of the plurality of spring elements is at least partially nested within a second spring element of the plurality of spring elements.

12. The pedal unit of claim 1, wherein the third cylinder element has at least one venting hole.

13. The pedal unit of claim 12, further comprising a dust filter to prevent dust from being pulled into the plurality of cylinder elements through the at least one vent hole of the third cylinder.

14. The pedal unit of claim 1, wherein the second cylinder element has a double-walled design comprising a second element outer wall and a second element inner wall that form an intermediate space therebetween for receiving a first element outer wall of the first cylinder element, the second element outer wall being connected to the second element inner wall by an annular connecting wall;
    wherein the vent hole is disposed in the annular connecting wall to control pressure in the intermediate space.

15. A pedal unit for a motor vehicle, the pedal unit comprising:
    a plurality of cylinder elements which are guided one inside the other in a telescopic fashion along a movement axis;
    a pedal face coupled to one of the cylinder elements;
    a plurality of spring elements, each spring element being configured to interact with two cylinder elements to contribute to an opposing force at the pedal face; and
    a sensor unit configured to generate an output signal that is dependent on activation of the pedal face, the sensor unit being disposed within a support element;
    wherein each of the spring elements directly engages with the support element to apply the opposing force on the support element for measurement by the sensor unit.

16. A pedal unit for a motor vehicle, the pedal unit comprising:
    a plurality of cylinder elements which are guided one inside the other in a telescopic fashion along a movement axis such that each cylinder element contributes to a length of the pedal unit when the pedal unit is fully extended, the plurality of cylinder elements comprising a first cylinder element, a second cylinder element, and a third cylinder element, wherein the second cylinder element includes a vent hole to control pressure;

a pedal face for a user, the pedal face being coupled to the first cylinder element;
a plurality of spring elements, each spring element being configured to interact with two cylinder elements to contribute to an opposing force at the pedal face;
a sensor unit configured to generate an output signal that is dependent on activation of the pedal face; and
an adjustment mechanism connected to the third cylinder element and configured to extend and retract the pedal face via movement of the third cylinder element;
wherein the adjustment mechanism is configured to extend the pedal face into an operating position relative to a surface of a footwell of a motor vehicle;
wherein the adjustment mechanism is configured to retract the pedal face into a storage position relative to the surface of the footwell to prevent activation of the pedal face in an autonomous driving mode for the motor vehicle.

* * * * *